United States Patent [19]
Cox et al.

[11] Patent Number: 5,344,023
[45] Date of Patent: Sep. 6, 1994

[54] EGG CONTAINER ASSEMBLY

[75] Inventors: Patricia A. Cox, Ohio Township, Warrick County; David K. Miller, Evansville, both of Ind.

[73] Assignee: Whirlpool Corporation, Benton Harbor, Mich.

[21] Appl. No.: 176,028

[22] Filed: Dec. 30, 1993

[51] Int. Cl.$^5$ .................... B65D 85/62; B65D 81/02
[52] U.S. Cl. .................... 206/508; 220/508; 206/521.6; 206/45.34
[58] Field of Search .................... 220/508; 206/521.1–521.9, 563, 508

[56] References Cited

U.S. PATENT DOCUMENTS

| D. 160,848 | 11/1950 | Ernster | D44/10 |
| D. 210,613 | 3/1968 | Moore | D44/10 |
| D. 239,875 | 5/1976 | Armstrong | D67/3 B |
| 1,997,220 | 4/1935 | Killgore | 211/114 |
| 2,188,044 | 1/1940 | Hickman | 211/143 |
| 2,438,443 | 3/1948 | Jermyn | 211/143 |
| 2,926,809 | 3/1960 | Studler | 217/30 |
| 3,145,870 | 8/1964 | Lockwood | 206/508 |
| 3,484,035 | 12/1969 | Swett et al. | 229/15 |
| 3,861,578 | 1/1975 | McHan | 206/521.1 |
| 4,011,954 | 3/1977 | Galli | 211/14 |
| 4,235,338 | 11/1980 | Dugan et al. | 206/508 X |
| 5,102,034 | 4/1992 | Amabili | 229/2.5 EC |

Primary Examiner—William I. Price
Attorney, Agent, or Firm—Thomas J. Roth; Stephen D. Krefman; Robert O. Rice

[57] ABSTRACT

A three piece egg container assembly is provided which includes a rectangular base member having a bottom wall, sidewalls and an open top, an egg tray with a plurality of egg receiving receptacles receivable within the base member and a removable lid for the base member. The lid is configured with a peripheral lip such that one side of the lid conforms to the base member bottom wall, the open top of the base member and the egg tray such that the first surface of the lid could receive any of those elements. A second side of the lid conforms to the opening of the base member such that the lid can be received in the opening either in an upright position or an inverted position. Stacking of numerous base members with intervening inverted lids or stacking of the egg tray on the lid is thereby accommodated by this construction.

18 Claims, 2 Drawing Sheets

EGG CONTAINER ASSEMBLY

BACKGROUND OF THE INVENTION

The present invention relates to an egg container assembly and more particularly to an egg container configurable in different orientations.

Containers for holding eggs are well known in the art. For example, in U.S. Pat. No. 1,997,220 there is disclosed a tray for use in a refrigerator having two shelves for separately receiving egg carriers which could be slid onto the shelves. The tray is disclosed as either being mounted on top of a refrigerator shelf or hanging from a refrigerator shelf, and in both instances, the egg carriers are slid on to horizontal support surfaces of the tray. The arrangement disclosed would permit a maximum of two egg carriers to be used with each tray.

U.S. Pat. No. D 210,613 discloses an egg caddy having a central handle and a number of receptacles around the handle for receiving eggs.

U.S. Pat. No. 3,484,035 discloses a container having two side-by-side wells for receiving egg trays which each have depressions for receiving eggs. A lid may be provided over the top of the base member to seal the egg trays within the container. In this arrangement only two egg trays can be utilized with any one container and there does not appear to be any provision for stacking containers.

SUMMARY OF THE INVENTION

The present invention provides an egg container assembly comprising three components which can be arranged in various configurations to accommodate different egg storing requirements. The container comprises a bottom member which has a base wall and four upstanding sidewalls with an open top. A lid member is provided which has a planar center section and a peripheral lip portion. Finally, a nest member is provided having a planar section with receptacles therein for receiving eggs and a peripheral wall portion to elevate the planar section above a supporting surface.

The planar center section of the lid member is sized to receive the base wall when the lid member is placed under the bottom member with the peripheral lip portion extending upwardly. The peripheral lip portion is sized to engage the bottom member sidewalls to support the lid member in the open top with the peripheral lip portion extending upwardly. Also the peripheral lip portion is sized to engage around an outside of the sidewalls at the open top with the peripheral lip portion extending downwardly.

The nest member is sized to be received on the base wall of the bottom member and on the planar center section of the lid member with the peripheral lip portion extending upwardly.

Thus, the nest member, which receives the eggs, can be used separately to carry eggs and hold the eggs while the nest member is on a supporting surface. Also, the nest member can be placed within the base member with the lid member placed on top of the base member, with the peripheral lip extending downwardly to enclose the eggs within the base member. Alternatively, the lid member may be reversed or inverted on the base member so that the peripheral lip portion extends upwardly which would permit a second nest member to be placed on top of the inverted lid member, or a second base member to be placed on the inverted lid member.

Thus, by utilizing a number of base members and inverted lid members, a stack of egg containers could be provided with an unlimited height.

The bottom member sidewalls are sufficiently tall so as to permit a standard sized egg carton to be received within the bottom member so that an unlimited number of eggs could also be stored in the stack of egg containers even without separately using the nest member.

The nest portion has a handle extending upwardly therefrom for manual grasping of the nest member to allow it to be removed from the base member. Preferably the nest member is sized to hold one dozen eggs.

DETAILED DESCRIPTION OF THE PREFERRED EMBODIMENTS

Figure 1:
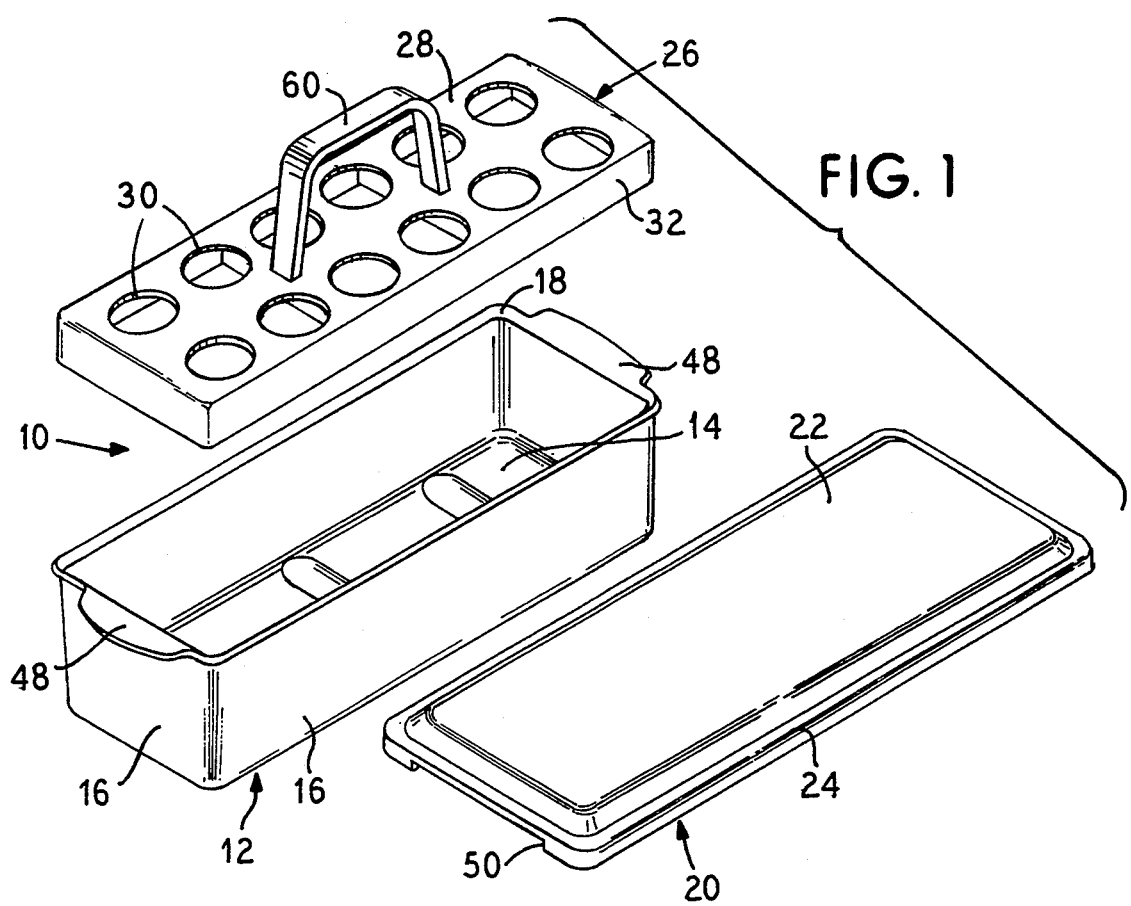
FIG. 1 is a perspective exploded view of the three pieces forming a single egg container assembly.

In FIG. 1 there is illustrated a three piece egg container assembly generally at 10 which consists of a rectangular shaped bottom member 12 having a base wall 14 and four upstanding sidewalls 16 with an open top 18. A rectangular shaped lid member 20 has a planar center section 22 and a peripheral lip portion 24. A rectangular shaped nest member 26 has a planar section 28 with receptacles 30 therein for receiving eggs and a peripheral wall portion 32 to elevate the planar section 28 above a supporting surface.

Figure 2:
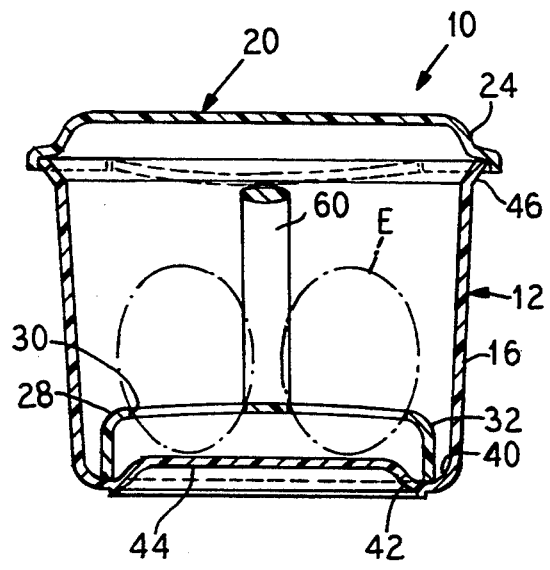
FIG. 2 is an end sectional view of an assembled egg container assembly in a closed condition.

As seen in FIG. 2, the bottom member 12 has a bottom wall 42 adjoining the sidewalls 16 with a plurality of lateral ribs 44 formed in the bottom wall 42 having a slightly elevated level. The peripheral wall portion 32 of the nest member 26 is dimensioned so as to rest on the bottom wall 42 of the bottom member 12 without interfering with or engaging the ribs 44. The peripheral wall portion 32 of the nest member 26 is sufficiently high so as to elevate eggs E carried by the planar section 28 of the nest member above the ribs 44 of the bottom member bottom wall 42.

An upper end 46 of the sidewalls 16 of the bottom member 12 are flared outwardly to form the open top 18. An outwardly extending handle flange 48 is provided at each end of the bottom member 12 to assist in picking up and carrying the bottom member.

The lid member peripheral lip portion 24 is sized to engage around an outside of the sidewalls 16 of the bottom member when the peripheral lip portion of the lid member 20 extending downwardly as shown in FIG. 2. A recess 50 is provided at each end of the lip portion 24 to accommodate the handle flanges 48. In this manner, the lid member 20 will close the open top 18 of the bottom member 12.

Figure 3:
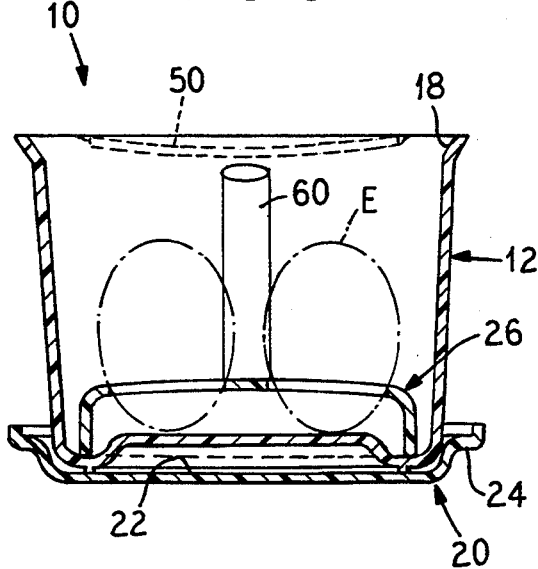
FIG. 3 is an end sectional view of an assembled egg container assembly in an open condition.

FIG. 3 illustrates a slightly different arrangement of the components of the egg container assembly 10. In this arrangement the lid member 20 is inverted and placed under the bottom member 12 thus permitting the open top 18 of the bottom member to remain open to fully expose the nest member 26 positioned within the bottom member. Thus it is clear that the planar center section 22 of the lid member 20 is sized to receive the base wall 14 of the bottom member 12 when the lid member is placed under the bottom member with the peripheral lip portion 24 of the lid member extending upwardly. This arrangement may be utilized when it is desired to leave the container open, yet minimize the space required for storing the lid member. It can simply be placed under the bottom member without consuming additional space.

Figure 4:
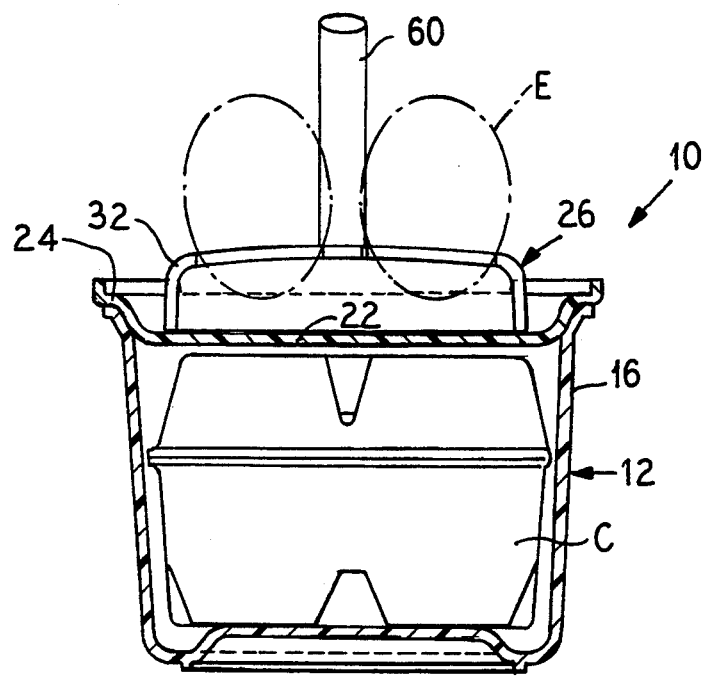
FIG. 4 is a an end sectional view of an egg container assembly with the lid member inverted on the bottom member, with a standard egg carton within the bottom member and the nest member on top of the inverted lid member.

FIG. 4 illustrates another configuration of the egg container assembly in which the lid member 20 is inverted and placed in the top opening 18 of the bottom member 12. This figure illustrates that the peripheral lip portion 24 of the lid member 20 is sized to engage the sidewalls 16 of the bottom member 12 to support the lid member in the top opening 18 with the peripheral lip portion 24 extending upwardly.

This figure also illustrates that the peripheral wall portion 32 of the nest member 26 and the planar center section 22 of the lid member 20 are sized to permit the nest member to be received on the planar center section of the lid member when the lid member is in an inverted position with the peripheral lip portion 24 extending upwardly.

FIG. 4 also illustrates that the sidewalls 16 of the bottom member 12 are sufficiently tall so as to permit a standard sized egg carton C to be received within the bottom member 12 with the lid member 20 supported in the open top 18 with the peripheral lip portion 24 extending upwardly. In this arrangement a full dozen eggs can be stored within the bottom member 12 in the standard egg carton C, with an additional twelve eggs being stored on the nest member 26 carried on the inverted lid member 20.

Figure 5:
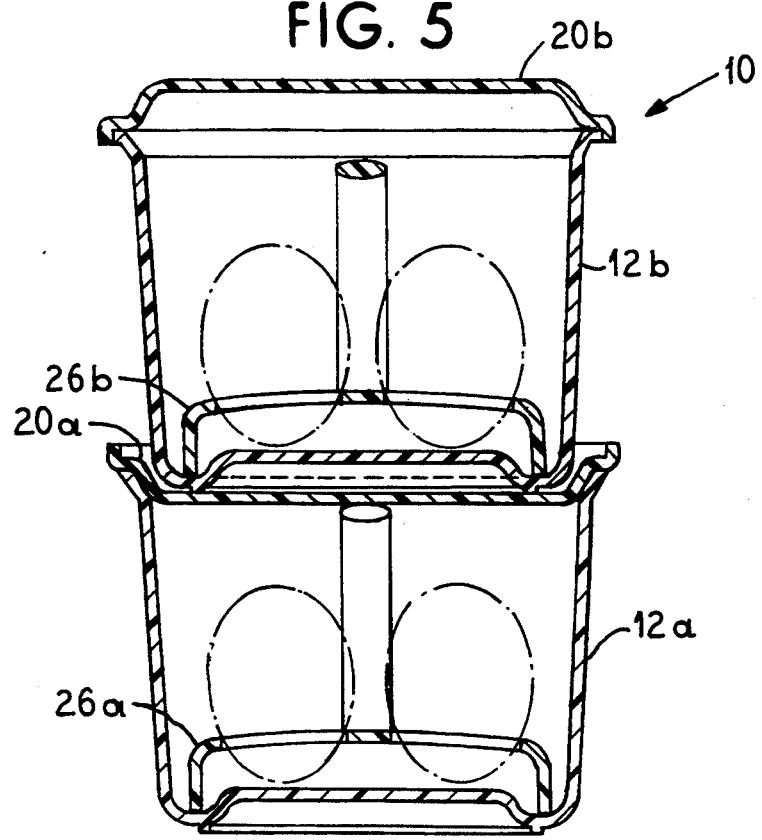
FIG. 5 is a end sectional view of a stack of egg container assemblies utilizing two bottom members, two nest members and two lid members.

FIG. 5 shows yet another arrangement of the egg container assembly, particularly useful when multiple egg container assemblies 10 are utilized. In this arrangement a first base member 12a receives a first nest member 26a and a first lid member 20a is carried in an inverted orientation on the first base member. A second bottom member 12b is carried on top of the inverted first lid member 20a and it receives a second nest member 26b and a second lid member 20b in a standard orientation to seal the second bottom member. It would be appreciated that any number of additional bottom members, nest members and inverted lid members can be inserted between the first lid member 20a and the second bottom member 12b to form a stack of unlimited height.

The nest member 26 also includes a centrally located handle 60 which extends upwardly above the planar section 28 of the lid member 20 to assist in manual removal of the nest member from the bottom member 12. The handle 60 and sidewalls 16 of the bottom member are sized to permit the stacking shown in FIG. 5 even when the lid member is placed in an inverted orientation on the open top of the bottom member 12. The egg tray receptacles 30 are preferably twelve in number and may comprise either depressions in the planar surface 12 or may comprise apertures through the planar surface.

Although the bottom member 12, the lid member 20 and the nest member 26 may be formed from a wide variety of materials, they preferably are formed of molded plastic and may even be formed of a transparent plastic to permit viewing of the contents of the container without requiring that it be opened.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

The embodiments of the invention in which an exclusive property or privilege is claimed are defined as follows:

1. A three piece egg container assembly comprising:
   a bottom member having a base wall and four upstanding sidewalls with an open top;
   a lid member having a planar center section and a peripheral lip portion;
   a nest member having a planar section with receptacles therein for receiving eggs and a peripheral wall portion to elevate said planar section above a supporting surface;
   said planar center section of said lid member sized to receive said base wall when said lid member is placed under said bottom member with said peripheral lip portion extending upwardly, said peripheral lip portion sized to engage said bottom member sidewalls to support said lid member in said open top with said peripheral lip portion extending upwardly, and said peripheral lip portion sized to engage around an outside of said sidewalls at said open top with said peripheral lip portion extending downwardly;
   said nest member sized to be received on said base wall of said bottom member and on said planar center section of said lid member with said peripheral lip portion extending upwardly.

2. A container assembly according to claim 1, wherein said nest portion has a handle portion extending upwardly therefrom.

3. A container assembly according to claim 1, wherein said bottom portion sidewalls are sufficiently tall so as to permit a standard sized egg carton to be received within said bottom member with said lid member supported in said open top with said peripheral lip portion extending upwardly.

4. A container assembly according to claim 1, wherein said bottom member and said open top are rectangular-shaped.

5. A container assembly according to claim 1, wherein said receptacles in said nest member comprise apertures in said planar section.

6. A container assembly according to claim 1, wherein said bottom member, said lid member and said nest member are formed of a molded plastic material.

7. A container assembly according to claim 1, wherein said bottom member is formed of a transparent material.

8. A container having a base, a plurality of sidewalls and an opening opposite said base, an egg tray having a plurality of egg-receiving receptacles, said egg tray being receivable within said container and a two-sided removable cover for said container, a first side of said cover being formed to conform to each of said container base, said container opening and said egg tray.

9. A container according to claim 8, wherein said egg tray includes a centrally located handle to assist in removing said egg tray from said container.

10. A container according to claim 8, wherein a second side of said cover is formed to conform to said container opening.

11. A container according to claim 8, wherein said base and said opening of said container are rectangular-shaped.

12. A container according to claim 8, wherein said egg tray comprises a planar section containing said egg-receiving receptacles and a peripheral wall portion to elevate said planar section above a supporting surface.

13. A container according to claim 8, wherein said cover comprises a planar center section and a peripheral lip portion.

14. A container according to claim 8, wherein said receptacles comprise apertures in said egg tray.

15. A container according to claim 8, wherein said base, egg tray and cover are formed of a molded plastic material.

16. A container according to claim 8, wherein said base sidewalls are sufficiently tall so as to permit a standard sized egg carton to be received within said base with said cover engaging said container opening.

17. A three piece egg container assembly comprising:
a rectangular bottom member having a bottom wall, upstanding sidewalls and an open top;
an egg tray having a plurality of egg-receiving receptacles and support portions for elevating said receptacles above a supporting surface; and
a rectangular two-sided removable lid member for said bottom member, a first side of said lid member being formed to conform to each of said bottom member bottom wall, bottom member open top and said egg tray.

18. An egg container assembly according to claim 17, wherein said support means for said egg tray comprises a peripheral wall extending around a periphery of a planar surface having said egg receiving receptacles therein.

* * * * *